(12) United States Patent
Choi et al.

(10) Patent No.: US 11,580,825 B2
(45) Date of Patent: Feb. 14, 2023

(54) SYSTEM AND METHOD FOR DEPOSIT AND WITHDRAWAL SERVICE USING AUTOMATED TELLER MACHINE AND COMPUTER PROGRAM FOR THE SAME

(71) Applicant: COOCON CO., LTD., Seoul (KR)

(72) Inventors: Won Seok Choi, Seoul (KR); Sang Jin Lee, Seoul (KR)

(73) Assignee: COOCON CO. Ltd., Seoul (KR)

( * ) Notice: Subject to any disclaimer, the term of this patent is extended or adjusted under 35 U.S.C. 154(b) by 0 days.

(21) Appl. No.: 17/411,437

(22) Filed: Aug. 25, 2021

(65) Prior Publication Data

US 2022/0068092 A1 Mar. 3, 2022

(30) Foreign Application Priority Data

Aug. 25, 2020 (KR) .......................... 10-2020-0107262

(51) Int. Cl.
*G07F 19/00* (2006.01)
*G06Q 40/02* (2023.01)

(52) U.S. Cl.
CPC .......... *G07F 19/202* (2013.01); *G06Q 40/02* (2013.01); *G07F 19/203* (2013.01); *G07F 19/206* (2013.01)

(58) Field of Classification Search
CPC .... G07F 19/202; G07F 19/203; G07F 19/206; G06Q 40/02
USPC ........................................................ 235/379
See application file for complete search history.

(56) References Cited

U.S. PATENT DOCUMENTS

2021/0118052 A1* 4/2021 Walser ................... G06Q 20/36

FOREIGN PATENT DOCUMENTS

| JP | 2002109632 | 4/2002 |
|---|---|---|
| KR | 100235531 | 12/1999 |
| KR | 1020070051503 | 5/2007 |
| KR | 1020070111645 | 11/2007 |
| KR | 1020080006097 | 1/2008 |
| KR | 1020100131864 | 12/2010 |

(Continued)

*Primary Examiner* — Daniel A Hess
(74) *Attorney, Agent, or Firm* — Fish & Richardson P.C.

(57) ABSTRACT

A deposit and withdrawal service system using Automated Teller Machine (ATM) includes a communication module configured to receive a transaction request associated with a customer's asset managed by an institution from the ATM, and transmit a processing result received from the institution in response to the transaction request to the ATM, and a statement conversion module configured to convert the transaction request received from the ATM into aggregated details data that is independent from the ATM, and convert the processing result received from the institution into statement details data corresponding to the ATM having requested the transaction. The communication module is further configured to transmit the aggregated details data to the institution, receive the processing result from the institution, and transmit the processing result to the ATM as the statement details data. According to the deposit and withdrawal service system, it is possible to standardize a task structure between the ATM operating institution and the institution, and deposit and withdraw the customer's points or loans managed by the institution such as a Fintech institution or a card company via the ATM through a relaying function provided by the deposit and withdrawal service system.

11 Claims, 7 Drawing Sheets

(56) References Cited

FOREIGN PATENT DOCUMENTS

| KR | 1020160074178 | 6/2016 |
|----|---------------|--------|
| KR | 102119449     | 6/2020 |

* cited by examiner

SYSTEM AND METHOD FOR DEPOSIT AND WITHDRAWAL SERVICE USING AUTOMATED TELLER MACHINE AND COMPUTER PROGRAM FOR THE SAME

CROSS-REFERENCE TO RELATED APPLICATIONS

This application claims priority under 35 U.S.C. § 119 to Korean Patent Application No. 10-2020-0107262, filed on Aug. 25, 2020, in the Korean Intellectual Property Office, the disclosure of which is incorporated herein by reference in its entirety.

TECHNICAL FIELD

Embodiments relate to a system and method for deposit and withdrawal service using Automated Teller Machine (ATM) and a computer program for the same. More particularly, embodiments relate to a deposit and withdrawal service for cash depositing and withdrawing of customer assets managed by institutions such as Fintech companies or card companies through ATM.

BACKGROUND

Recently, in the emerging era of Fintech, the technical and social infrastructure enables businessmen other than financial institutions such as banks to provide users with financial services combined with information communication technology, for example, a simple settlement service, introducing the new paradigm for financial markets.

The existing financial institutions are increasing their investment to platforms that can be used in mobile devices to attract customers in a changing environment, and offer Internet-only banks having no offline branch. However, even when customers use mobile platforms, they have to visit offline branches or use Automated Teller Machines (ATMs) to deposit and withdraw real money, and Internet-only banks are impossible to directly deposit and withdraw real money due to the absence of offline branches.

ATMs are devices that allow customers of financial institutions to process cash deposits, cash withdrawals, account transfers and currency exchanges in an unmanned manner without the assistance of windows in branches, and ATM operators have made efforts on affiliation with banks or card companies. For example, Patent No. 10-0235531 discloses electronic money handling in ATM based on IC card.

However, Fintech companies yet cannot provide services in conjunction with ATMs. For Fintech companies to provide services in conjunction with ATMs, it is necessary to make agreements between Fintech institutions and ATM operating institutions about the security method and the communication method for transmitting and receiving finance related information, and the statement method including the type and format of data transmitted and received, which imposes the increased service establishment costs on Fintech businessmen. Additionally, when Fintech services are involved with a plurality of financial institutions or ATMs of a plurality of institutions, there is a burden of making agreements for each financial institution.

SUMMARY

To solve the above-described problem of the existing technology, according to an aspect of the present disclosure, there are provided a system and method for deposit and withdrawal service using Automated Teller Machine (ATM) configured to make deposits and withdrawals of customers' points or loans managed by Fintech companies or card companies through the ATM via the customers' authentication, and a computer program for the same.

The deposit and withdrawal service system using Automated Teller Machine (ATM) according to an aspect of the present disclosure comprises: a communication module configured to receive a transaction request associated with a customer's asset managed by an institution from the ATM, and transmit a processing result received from the institution in response to the transaction request to the ATM; and a statement conversion module configured to convert the transaction request received from the ATM into aggregated details data that is independent from the ATM, and convert the processing result received from the institution into statement details data corresponding to the ATM having requested the transaction, wherein the communication module is further configured to transmit the aggregated details data to the institution, receive the processing result from the institution, and transmit the processing result to the ATM as the statement details data.

According to an embodiment, the statement conversion module is further configured to generate the statement details data by extracting information from the processing result based on layout information defining at least one of a data type or a data sequence corresponding to the ATM.

According to an embodiment, the statement conversion module comprises: a statement method conversion unit configured to convert the transaction request or the processing result into intermediate data of a statement method; a transaction itemization unit configured to determine at least one of a transaction type, an institution or an ATM corresponding to the transaction request or the processing result; and a statement details conversion unit configured to convert the intermediate data into the aggregated details data or the statement details data based on at least one of the transaction type, the institution or the ATM determined by the transaction itemization unit.

According to an embodiment, the transaction request includes one-time authentication information provided to a user using the institution by the institution and identification information corresponding to the institution, and the aggregated details data includes the one-time authentication information for authentication by the institution, and the communication module is further configured to transmit the aggregated details data to the institution corresponding to the transaction request using the identification information.

According to an embodiment, the deposit and withdrawal service system using ATM further comprises: a funds settlement module configured to send operating funds corresponding to a deposit of the institution to an account of an operating institution of the ATM for cash payment by the ATM.

According to an embodiment, the funds settlement module is further configured to, before transmitting the processing result to the ATM, subtract a withdrawal amount corresponding to the processing result from the deposit of the institution, and when the deposit of the institution is less than the withdrawal amount, reject the transaction request of the ATM.

According to an embodiment, the deposit and withdrawal service system using ATM further comprises: a location providing module configured to provide location information of at least one ATM capable of communicating with the deposit and withdrawal service system in response to the request received from the institution or a user device of a user using the institution.

A deposit and withdrawal service method using Automated Teller Machine (ATM) according to an aspect of the present disclosure comprises: receiving, by a deposit and withdrawal service system, a transaction request associated with a customer's asset managed by an institution from the ATM; converting, by the deposit and withdrawal service system, the transaction request received from the ATM into aggregated details data that is independent from the ATM; transmitting, by the deposit and withdrawal service system, the aggregated details data to the institution; receiving, by the deposit and withdrawal service system, a processing result corresponding to the aggregated details data from the institution; converting, by the deposit and withdrawal service system, the processing result into statement details data corresponding to the ATM having requested the transaction; and transmitting, by the deposit and withdrawal service system, the statement details data to the ATM.

According to an embodiment, converting into the statement details data comprises generating, by the deposit and withdrawal service system, the statement details data by extracting information from the processing result based on layout information defining at least one of a data type or a data sequence corresponding to the ATM.

According to an embodiment, converting into the statement details data comprises: converting, by the deposit and withdrawal service system, the processing result into intermediate data of a statement method; determining, by the deposit and withdrawal service system, at least one of a transaction type, an institution or an ATM corresponding to the processing result; and converting, by the deposit and withdrawal service system, the intermediate data into the statement details data based on at least one of the determined transaction type, institution or ATM.

According to an embodiment, the transaction request includes one-time authentication information provided to a user using the institution by the institution and identification information corresponding to the institution, and the aggregated details data includes the one-time authentication information for authentication by the institution, and transmitting the aggregated details data to the institution comprises identifying, by the deposit and withdrawal service system, the institution corresponding to the transaction request using the identification information.

According to an embodiment, the deposit and withdrawal service method using ATM further comprises sending, by the deposit and withdrawal service system, operating funds corresponding to a deposit of the institution to an account of an operating institution of the ATM for cash payment by the ATM.

According to an embodiment, the deposit and withdrawal service method using ATM further comprises: before transmitting the statement details data to the ATM, subtracting, by the deposit and withdrawal service system, a withdrawal amount corresponding to the processing result from the deposit of the institution; and rejecting, by the deposit and withdrawal service system, the transaction request of the ATM when the deposit of the institution is less than the withdrawal amount.

According to an embodiment, the deposit and withdrawal service method using ATM further comprises providing, by the deposit and withdrawal service system, location information of at least one ATM capable of communicating with the deposit and withdrawal service system in response to the request received from the institution or a user device of a user using the institution.

A computer program according to an aspect of the present disclosure is stored in a computer-readable recording medium to perform the deposit and withdrawal service method using ATM according to the aforementioned embodiments in combination with hardware.

According to the system and method for deposit and withdrawal service using Automated Teller Machine (ATM) according to an aspect of the present disclosure, it is possible to standardize a task structure between at least one ATM operating institution and at least one institution, and exchange information between the institution such as a Fintech institution and the ATM operating institution through a mediation function provided by the deposit and withdrawal service system. Through this, it is possible to deposit and withdraw a virtual asset such as a customer's points or loans managed by a Fintech company or a card company through ATM.

According to the system and method for deposit and withdrawal service using ATM according to an aspect of the present disclosure, it is possible to provide new sales opportunities to ATM operating institutions that have focused on affiliation with banks or card companies, contributing of revenue model generation and increased profitability, and with the trend towards deregulation such as prepayment limit increase or overseas payment approval, it is possible to provide new business opportunities to Fintech companies. For example, using the system and method for a deposit and withdrawal service using ATM according to an aspect of the present disclosure, it is possible to create new businesses using ATM, for example, currency exchange using automatic equipment.

Additionally, according to the system and method for deposit and withdrawal service using ATM according to an aspect of the present disclosure, it is possible to make a deposit/withdrawal request based on data automatically converted according to statement methods, statement details and communication methods for each ATM operating institution, and support a variety of communication protocols (for example, https, TCP/IP, etc.), data transmission/reception formats (for example, plain text, JSON, etc.) and encoding/decoding methods (for example, One-Time Authentication (OTA), Fintech service account management, Transport Layer (TLS), etc.) that are easy to establish services of Fintech institutions, thereby running a stable Fintech service system through a specialized platform provided by a deposit and withdrawal service system.

DETAILED DESCRIPTION OF EMBODIMENTS

Hereinafter, embodiments of the present disclosure will be described in detail with reference to the accompanying drawings.

Figure 1:
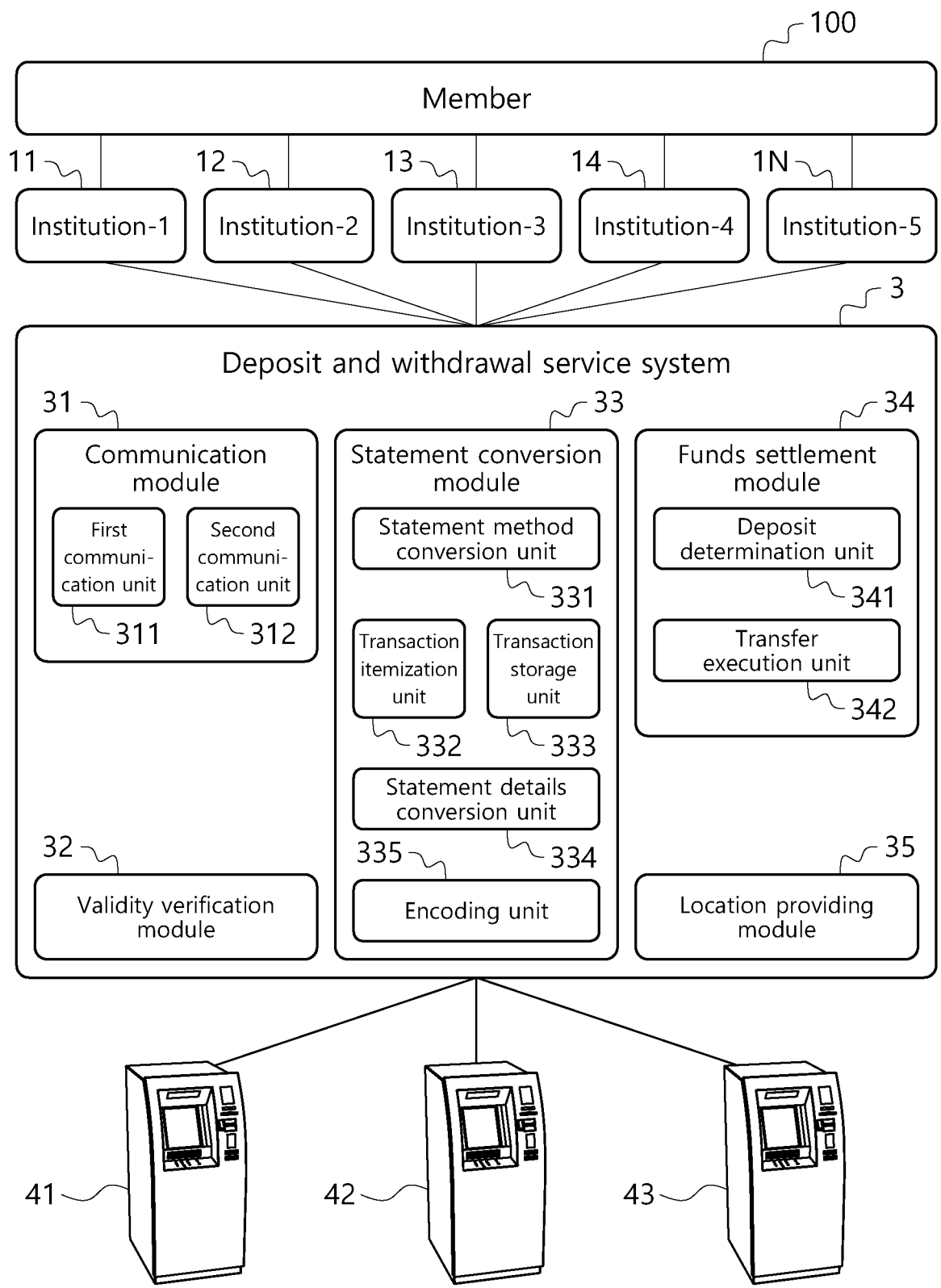
FIG. 1 is a schematic block diagram of a deposit and withdrawal service system using Automated Teller Machine (ATM) according to an embodiment.

FIG. 1 is a schematic block diagram of a deposit and withdrawal service system using Automated Teller Machine (ATM) according to an embodiment.

Referring to FIG. 1, the deposit and withdrawal service system 3 according to this embodiment is configured to receive a transaction request from at least one ATM 41, 42, 43 and provide a processing result of the transaction request through the ATMs 41, 42, 43. When the transaction that a user requested to the ATMs 41, 42, 43 involves cash payments such as withdrawals or loans, the ATMs 41, 42, 43 may pay cash to the user according to the processing result received from the deposit and withdrawal service 3.

In this instance, the transaction request may refer to a request for carrying out financial services based on an asset of a member 100 managed by at least one institution 11, 12, 13, 14, 1N, for example, deposits, withdrawals, transfers, enquiries (balance enquiry, transaction details enquiry, account real-name enquiry, remitter information enquiry, etc.) and loans. Additionally, the transaction request may include a request for cancelling the previously requested transaction such as withdrawal cancellation, or a check request for verifying transaction details.

In the embodiments of the present disclosure, the institutions 11, 12, 13, 14, 1N refer collectively to businessmen that allow the member 100 to use financial services based on information communication technology by operating in association with an account of the member 100 opened in a financial institution, although it is not a financial institution such as a bank that directly manages the user's cash. For example, the institutions 11, 12, 13, 14, 1N may be Fintech businessmen that provide Fintech services, for example, simple loans or simple remittance, or card companies that manage points raised according to the usage details of credit cards or check cards of the member 100.

Additionally, the Fintech service as used herein may include transaction brokerage that provides transaction services for virtual money based on a blockchain network such as Bitcoin, or a virtual money wallet service that provides a storage service for virtual money of the member 100.

Although not shown in the drawings, the member 100 may use the Fintech services provided by the institutions 11, 12, 13, 14, 1N by running an application (or app) for communication with each institution 11, 12, 13, 14, 1N on a user device (not shown) such as a smartphone. Additionally, the member 100 may acquire authentication information (for example, One Time Password (OTP)) to input to the ATMs 41, 42, 43 through communication with the institutions 11, 12, 13, 14, 1N, and it will be described in detail below.

When the institutions 11, 12, 13, 14, 1N are Fintech businessmen or card companies, not financial institutions, even though there is a virtual asset (for example, card points, simple remittance balance, virtual money balance, etc.) of the member 100 related to Fintech services or card services, the member 100 cannot withdraw the virtual asset in cash through the ATMs 41, 42, 43, and needs to change the virtual asset to real money through an account of the member 100 opened in a separate financial institution such as a bank.

The deposit and withdrawal service system 3 according to embodiments serves to receive a transaction request related to the virtual asset of the member 100 managed by the institutions 11, 12, 13, 14, 1N from the at least one ATM 41, 42, 43, and perform tasks such as deposits, withdrawals, enquiries and loans for the virtual asset of the member 100 managed by the institutions 11, 12, 13, 14, 1N through the ATMs 41, 42, 43 by affiliation with the corresponding institutions 11, 12, 13, 14, 1N and the operating institutions of the ATMs 41, 42, 43.

Additionally, the deposit and withdrawal service system 3 may perform the function of a mediation platform with regard to transaction statement transmitted and received by the institutions 11, 12, 13, 14, 1N and the ATMs 41, 42, 43 and its communication method to allow the at least one institution 11, 12, 13, 14, 1N and the ATMs 41, 42, 43 operated by at least one operating institution to transmit and receive the transaction request and result. Through this, the task structure and communication channel between various institutions 11, 12, 13, 14, 1N and various ATM operating institutions may be standardized through the deposit and withdrawal service system 3.

For the above-described operation, the deposit and withdrawal service system 3 according to embodiments may be connected to the at least one institution 11, 12, 13, 14, 1N and the at least one ATM 41, 42, 43 via a wired and/or wireless network to enable communication. In the specification, the communication method via the wired and/or wireless network may be implemented using any communication method that enables networking between objects, and is not limited to wired communication, wireless communication, 3G, 4G, or any other method.

The devices described herein may have aspects of entirely hardware, or partly hardware and partly software. For example, the deposit and withdrawal service systems 3 according to embodiments and each of a system, a device and a server that communicate with the deposit and withdrawal service system 3 and each unit included therein may refer collectively to a device for transmitting and receiving data of a particular format and content by an electronic communication method and its related software. The term "unit", "module", "server", "system", "platform", "device" or "terminal" as used herein is intended to refer to a combination of hardware and software run by the corresponding hardware. For example, here, the hardware may be a data processing device including a central processing unit (CPU) or other processor. Additionally, the software run by the hardware may refer to a process being executed, an object, an executable, a thread of execution and a program.

Meanwhile, the number of the institutions 11, 12, 13, 14, 1N and the number and type of the ATMs 41, 42, 43 shown in the drawings of the specification is provided for illustrative purposes, and it will be easily understood by those skilled in the art that there is no limitation on the number of institutions or ATM operating institutions that can affiliate with the deposit and withdrawal service system 3.

In an embodiment, the deposit and withdrawal service system 3 includes a communication module 31 and a statement conversion module 33. Additionally, in an embodiment, the deposit and withdrawal service system 3 further includes a validity verification module 32. Additionally, in an embodiment, the deposit and withdrawal service system 3 further includes a funds settlement module 34. Further, in an embodiment, the deposit and withdrawal service system 3 further includes a location providing module 35.

In the specification, each module of the deposit and withdrawal service system 3 or each unit of the module is not necessarily intended to refer to separate components that are physically distinguished from one another. That is, although FIG. 1 shows each module 31-35 of the deposit and withdrawal service system 3 as separate blocks that are physically distinguished from one another, this represents the functional separation of the deposit and withdrawal service system 3 by the operation performed thereby. According to embodiments, all or some of the above-described modules may be integrated into a same device, or may be implemented as separate devices such that at least one module is physically separated from another module. For example, each module of the deposit and withdrawal service system 3 may be components connected to one another to enable communication under a distributed computing environment.

The statement conversion module 33 may convert the transaction request received from the ATMs 41, 42, 43 into data having the type and sequence of information to be transmitted to the institutions 11, 12, 13, 14, 1N regardless of the type of the ATMs 41, 42, 43, and in the specification, this is referred to as aggregated details data. Additionally, the statement conversion module 33 may convert the processing result received from the institutions 11, 12, 13, 14, 1N into data having the type and sequence of information corresponding to the ATMs 41, 42, 43 having requested the corresponding transaction, and in the specification, this is referred to as statement details data.

In an embodiment, the statement conversion module 33 includes a statement method conversion unit 331, a transaction itemization unit 332 and a statement details conversion unit 334. In an embodiment, the statement conversion module 33 further includes a transaction storage unit 333. Additionally, in an embodiment, the statement conversion module 33 further includes an encoding unit 335.

The statement method conversion unit 331 is configured to convert the transaction request of the ATMs 41, 42, 43 and the processing result of the institutions 11, 12, 13, 14, 1N into intermediate data that is independent from each institution. For example, the intermediate data may have a data format such as plain text, JSON, etc., but is not limited thereto.

The transaction itemization unit 332 may itemize the intermediate data converted by the statement method conversion unit 331 according to the type of the corresponding transaction and a target institution (i.e., the institution or the ATM). Additionally, the transaction storage unit 333 may store the transaction details itemized by the transaction itemization unit 332 for later settlement.

The statement details conversion unit 334 works using the itemization result by the transaction itemization unit 332 and is configured to change the layout of information, and may serve to convert the transaction request into the aggregated details data to be transmitted to the institutions 11, 12, 13, 14, 1N corresponding to the corresponding request, or convert the processing result of the institutions 11, 12, 13, 14, 1N into the statement details data suitable for the ATMs 41, 42, 43 having requested the corresponding transaction. In this instance, at least part of the aggregated details data and/or the statement details data may be encoded by the encoding unit 335.

The communication module 31 is configured to allow the deposit and withdrawal service system 3 to communicate with each institution 11, 12, 13, 14, 1N and each ATM 41, 42, 43. Specifically, the communication module 31 may include a first communication unit 311 and a second communication unit 312. The first communication unit 311 may transmit the aggregated details data converted by the statement conversion module 33 to the institutions 11, 12, 13, 14, 1N by a communication method corresponding to the corresponding institutions 11, 12, 13, 14, 1N, and receive the processing result of the request from the institutions 11, 12, 13, 14, 1N. Additionally, the second communication unit 312 may transmit the statement details data converted into the format corresponding to the ATMs 41, 42, 43 having requested the corresponding transaction from the processing result of the institutions 11, 12, 13, 14, 1N by the statement conversion module 33 to the ATMs 41, 42, 43 using the communication method corresponding to the ATMs 41, 42, 43 having requested the corresponding transaction.

The validity verification module 32 may verify whether the transaction request received by the ATMs 41, 42, 43 is valid in relation to the institutions 11, 12, 13, 14, 1N that can perform the corresponding transaction. For example, the validity verification module 32 may determine whether the request is valid using identification information (for example, ATM institution code and device ID) of the ATMs 41, 42, 43 included in the transaction request and identification information (for example, institution code) of the institutions 11, 12, 13, 14, 1N that will perform the requested transaction.

The funds settlement module 34 may process funds settlement between the at least one institution 11, 12, 13, 14, 1N, the operator of the deposit and withdrawal service system 3, and the operating institution of the at least one ATM 41, 42, 43 in relation to cash deposits and withdrawals made through the ATMs 41, 42, 43. In an embodiment, the funds settlement module 34 may include a deposit determination unit 341 to determine a deposit to be deposited in the operating institutions of the ATMs 41, 42, 43 in relation to each institution 11, 12, 13, 14, 1N, and a transfer execution unit 342 to deposit the operating funds corresponding to the deposit in the financial institution accounts of the operating institutions of the ATMs 41, 42, 43 from the financial institution accounts of the institutions 11, 12, 13, 14, 1N.

The location providing module 35 serves to provide location information of the ATMs 41, 42, 43 operating in association with the deposit and withdrawal service system 3. For example, the above-described location information may be provided to the user through the screen of each ATM 41, 42, 43, or the location providing module 35 may provide the corresponding location information to the institutions 11, 12, 13, 14, 1N, to allow the member 100 using the service of the institutions 11, 12, 13, 14, 1N to easily find the ATMs 41, 42, 43 that the member 100 can use his/her deposit and withdrawal service. In an embodiment, in addition to the location information of each ATM 41, 42, 43, the location providing module 35 may further provide cash balance information (for example, possible or impossible to withdraw, balance available for withdrawal, etc.) of each ATM 41, 42, 43.

Figure 2:
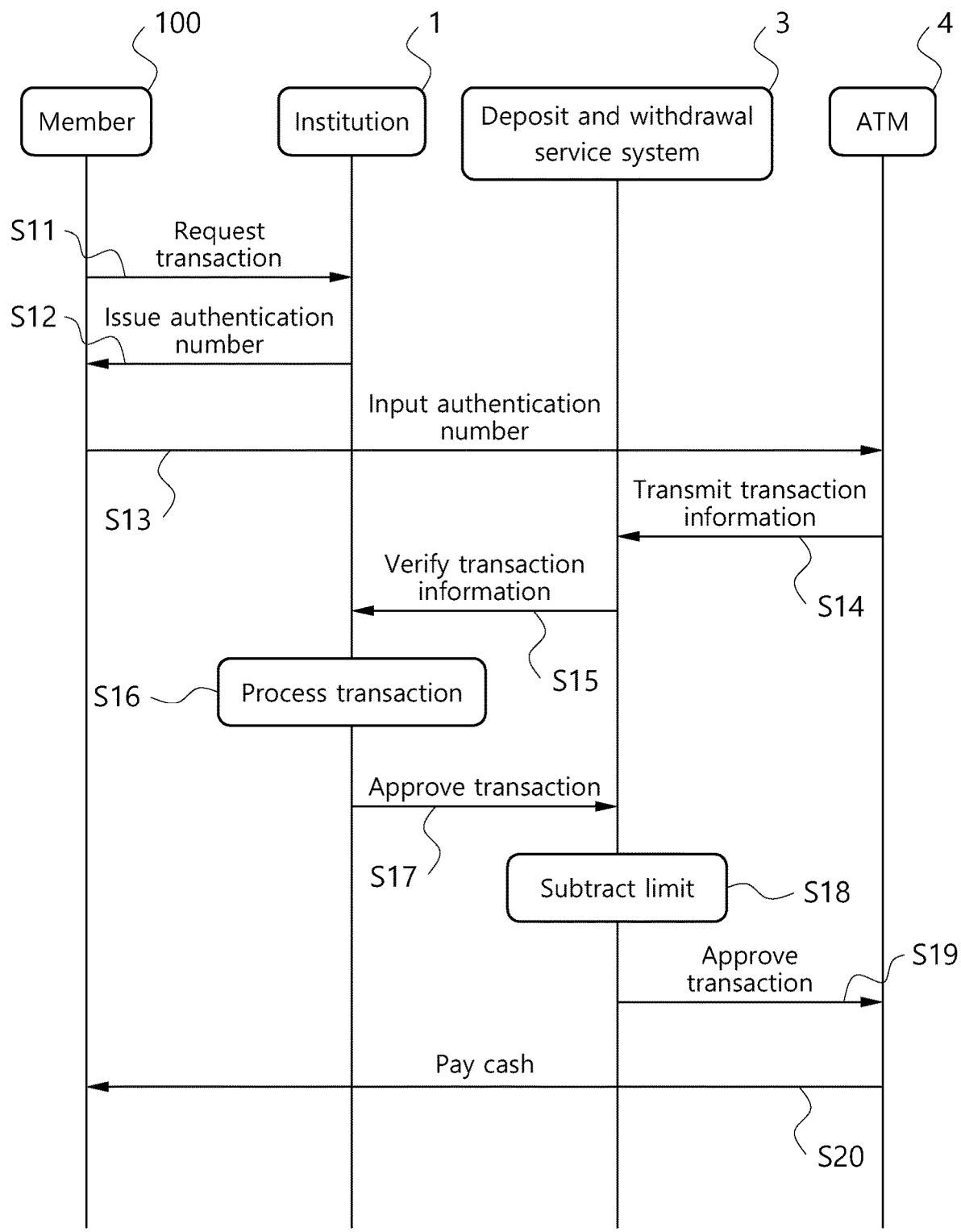
FIG. 2 is a flowchart showing each step of a deposit and withdrawal service method using ATM according to an embodiment.

FIG. 2 is a flowchart showing each step of a deposit and withdrawal service method using ATM according to an embodiment.

Referring to FIG. 2, the member 100 who wants to deposit and withdraw his/her virtual asset managed by the institution 1 using the ATM 4 may request an ATM based transaction to the institution 1 (S11), and receive authentication information from the institution 1 (S12). The above-described operation may be performed through the user device of the member 100 such as a smartphone in which an application (or app) running in communication with the institution 1 is installed.

In the case of using the ATM 4 using the real card as usually, holding the real card itself may perform a part of the user authentication function, but in the embodiments, there may be no real card for deposit and withdrawal of the virtual asset, and thus the user may receive authentication information as means for authentication to request transactions to the institution 1. For example, the authentication information may be OTP generated by the institution 1 according to a predetermined rule.

Subsequently, the member 100 may input the authentication information received from the institution 1 to the ATM 4 and request a deposit/withdrawal transaction for the virtual asset (S13). Although briefly shown in the drawing for convenience of description, it will be easily understood that at the same time as the process in which the member 100 inputs the authentication information (S13) or before and after the process (S13), among many types of transactions that can be performed through the ATM 4, a process in which the user selects a transaction of the virtual asset through the ATM 4, a process in which the user inputs an amount of deposit/withdrawal to the ATM 4, a process in which the user inputs personal information such as the date of birth or the account password of the virtual asset to the ATM 4, etc. may be additionally performed.

Figure 3A:
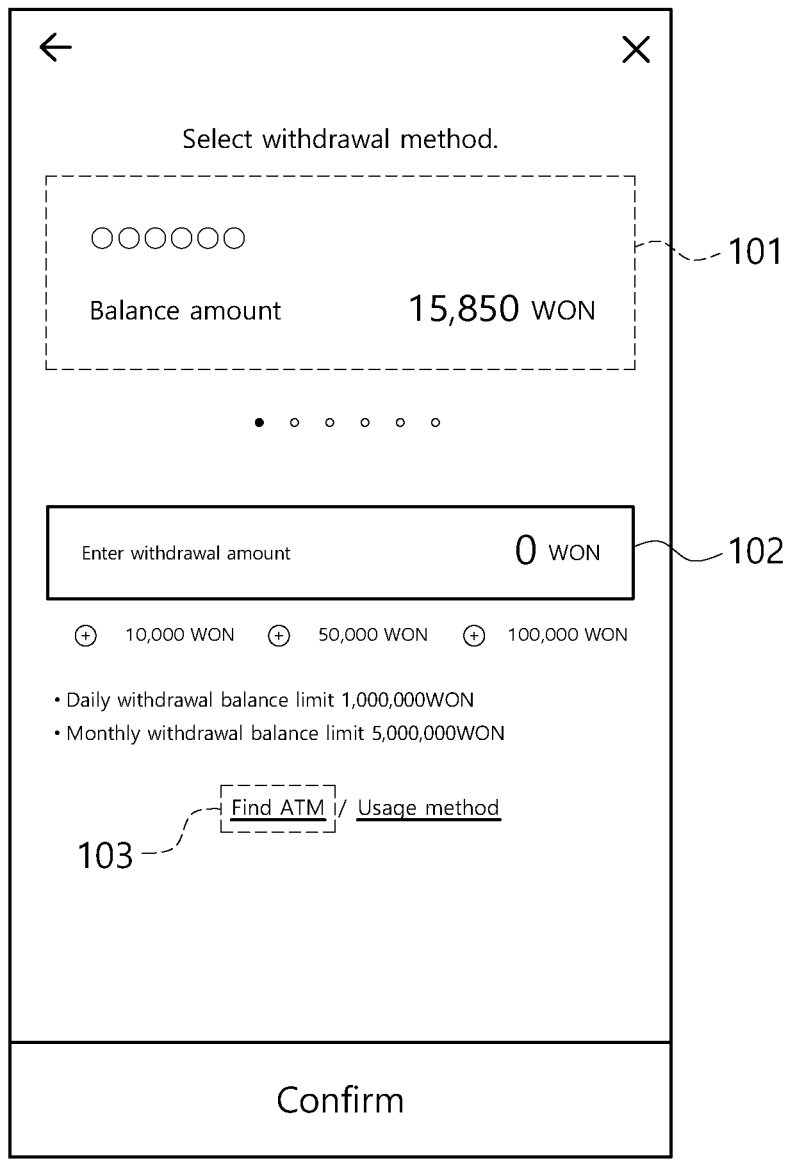
FIGS. 3A and 3B are conceptual diagrams showing an exemplary user interface on a user device using a deposit and withdrawal service system using ATM according to an embodiment.
Figure 3B:
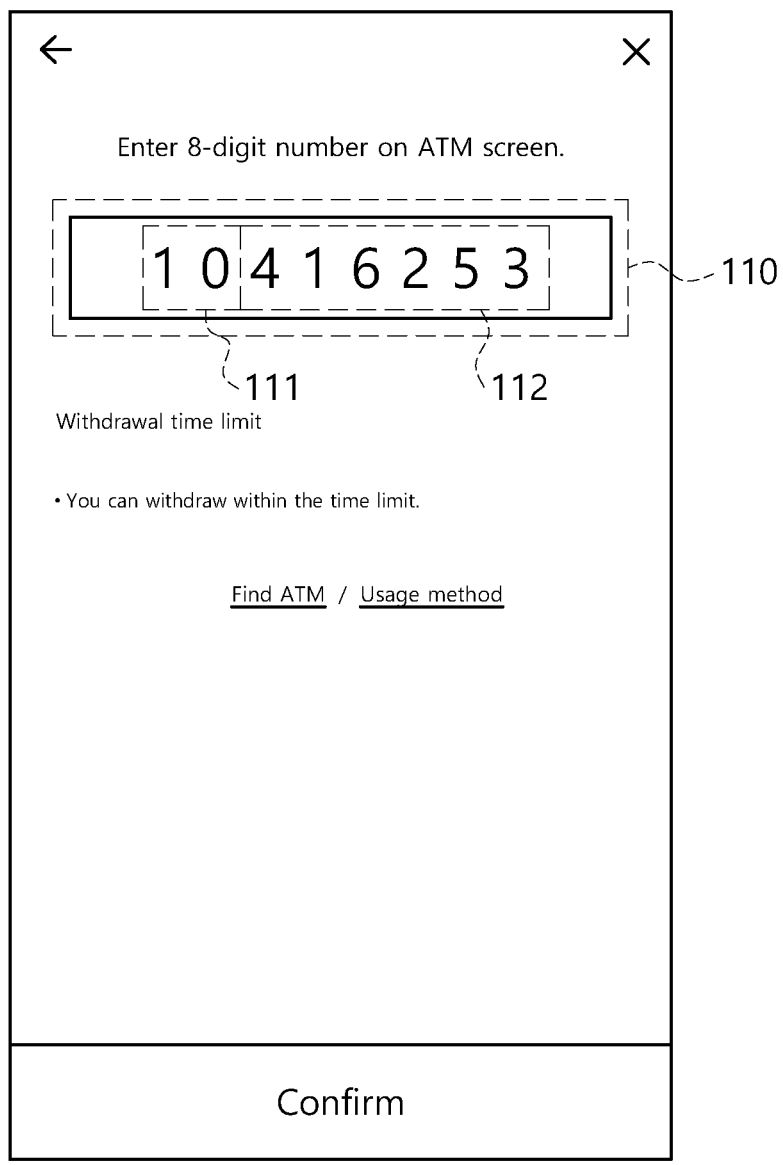

FIGS. 3A and 3B are conceptual diagrams showing an exemplary user interface on the user device using the deposit and withdrawal service system using ATM according to an embodiment.

Referring to FIG. 3A, the member may identify his/her virtual asset status (for example, points or virtual money balance) through an interface element 101 by running the application on the user device for using a Fintech service or a card service. Additionally, the member may input a transaction amount to request an ATM transaction through an interface element 102 displayed on the user device.

The embodiments of the present disclosure are described by taking as an example, the member communicating with the institution using the application running on the user device such as a smartphone. However, in another embodiment, the member may use a service provided by the institution by accessing a web page provided by the institution using a web browser running on the user device without installing a separate application.

In an embodiment, the member may inquire about location information of the ATM that can perform the ATM transaction for the virtual asset through an interface element 103. To this end, the location providing module 35 (in FIG. 1) of the deposit and withdrawal service system 3 may provide the institution with the location information of the ATMs 41, 42, 43 (FIG. 1) of the ATM operating institution affiliated with the deposit and withdrawal service system 3, and the institution may provide the members with the location information of the ATM such as the user interface shown in FIG. 3. Alternatively, in another embodiment, the location providing module may be configured to inquire about the location information of the ATM of the ATM operating institution affiliated with the deposit and withdrawal service system 3 by allowing the member to directly access the deposit and withdrawal service system 3 using the user device.

The member may identify the location information of the ATM in the form of a map or a list by selecting the interface element 103. In this instance, the deposit and withdrawal service system may further provide the institution with cash balance information that can be withdrawn from each ATM, to allow the member to identify the cash balance information of each ATM. For example, when the member requests a transaction to the institution by inputting a withdrawal amount through the interface element 102, the institution may inquire about the location information of only the ATM having the cash balance above the amount requested for withdrawal from the deposit and withdrawal service system and provide it to the member. In this instance, the provision of the location information of the institution by the deposit and withdrawal service system may be performed by the communication method using Application Programming Interface (API), but is not limited thereto.

When the member requests a transaction by inputting a transaction amount, the institution may provide the user with the OTP number corresponding to the authentication information through the interface element 110 as shown in FIG. 3B. In this case, after generating the corresponding OTP, setting a predetermined time limit is desirable for the OTP, and when it fails to request the transaction by inputting the corresponding OTP to the ATM during the time limit, it is desirable for the institution to discard the corresponding OTP.

In an embodiment, the authentication information may include a first code 111 corresponding to the institution identification information of the institution and a second code 112 generated based on the transaction time by a predetermined OTP generation rule. In this case, the first code 111 is used for the purpose of identification of the institution to perform the transaction in the ATM, and the second code 112 may be used for the purpose of user authentication by checking whether the code inputted to the ATM from the member matches the code generated by the institution based on the transaction time according to the OTP generation rule. However, this is provided for illustrative purposes, and the authentication information does not include the identification information of the institution, and the target institution may allow the user to input through a different type of user interface.

Additionally, although FIG. 3B shows that the authentication information has an 8-digit number including the first code 111 of 2-digit number and the second code 112 of 6-digit number, this is provided for illustrative purposes, and the authentication information may have different digit numbers from those described herein and may have any form including characters, numbers and/or special symbols.

Referring back to FIG. 2, when the transaction request including the authentication information inputted by the member 100, for example, the OTP, is inputted to the ATM 4, the deposit and withdrawal service system 3 may receive the transaction request including the authentication information and the transaction information from the ATM 4 (S14). The deposit and withdrawal service system 3 may itemize the transaction request from the ATM 4 according to the type of the corresponding transaction and/or the target institution, and transmit the transaction information and the authentication information to the target institution 1 to request for identification of the transaction (S15). In this instance, the deposit and withdrawal service system 3 may transmit the transaction request of the ATM 4 by the data layout and the communication method corresponding to the corresponding institution 1, and it will be described in detail below.

The institution 1 having received the transaction request from the deposit and withdrawal service system 3 may identify the virtual asset status of the user having requested the transaction, verify the authentication information inputted by the user, and when there is no problem in the transaction, perform transaction processing to reflect the requested transaction on the virtual asset status (S16).

For example, when the requested transaction is a deposit transaction to the virtual asset, the institution 1 may increase the virtual asset of the member 100 by the cash amount deposited in the ATM 4. Alternatively, when the requested transaction is a withdrawal transaction for the virtual asset, the institution 1 may identify if the virtual asset balance of the member 100 is equal to or larger than the sum of the withdrawal request amount and the fee enough to make withdrawals, and when it is possible to withdraw, may subtract the sum of the withdrawal request amount and the fee from the virtual asset of the member 100. Additionally, when the requested transaction is a transfer transaction, the institution 1 may subtract the virtual asset of the member 100 in the same way as the withdrawal transaction, and increase the virtual asset of another member corresponding to a transfer recipient by the transfer request amount of the member 100.

When the transaction processing is normally performed, the institution 1 may notify transaction approval details as the processing result of the transaction request to the deposit and withdrawal service system 3 (S17). Meanwhile, when the transaction cannot be approved due to a negative balance of the virtual asset, the institution 1 may notify the processing result including a rejection response for the transaction to the deposit and withdrawal service system 3.

The deposit and withdrawal service system 3 having received the processing result from the institution 1 may transmit the processing result to the ATM 4 having requested the corresponding transaction (S19). In this instance, the deposit and withdrawal service system 3 may convert the processing result of the institution 1 into the data layout and the communication method corresponding to the ATM 4 having requested the corresponding transaction and transmit it to the ATM 4, and it will be described in detail below.

When cash payment through the ATM 4 such as, for example, withdrawal transaction is necessary according to the type of the requested transaction, the ATM 4 may pay the withdrawal request amount of the member 100 in cash according to the transaction approval details received from the deposit and withdrawal service system 3. For cash payment, a predetermined deposit corresponding to the virtual asset usage amount of the institution 1 needs to be pre-stored in the ATM 4 according to an agreement between the institution 1 and the operating institution of the ATM 4.

To this end, in an embodiment, the funds settlement module 34 (FIG. 1) of the deposit and withdrawal service system 3 may determine the deposit corresponding to an expected transaction payment for the virtual asset of the institution 1 for a preset settlement cycle based on the virtual asset transaction details of the institution 1 stored in the deposit and withdrawal service system 3. For example, when settlement is made in a 1-day cycle, the funds settlement module 34 may calculate an amount of virtual asset withdrawal made for one day through the ATM 4 using the transaction details stored in the deposit and withdrawal service system 3, and determine a predetermined multiple (for example, twice) of the calculated withdrawal amount as the deposit, but is not limited thereto.

The deposit determined corresponding to the institution 1 needs to be deposited from the account of the institution 1 into the operating account of the deposit and withdrawal service system 3. Additionally, for the members 100 of the institution 1 to withdraw the virtual asset through the ATM 4, the operating funds corresponding to the deposit of the institution 1 needs to be transferred from the operating account of the deposit and withdrawal service system 3 to the savings account of the operating institution of the ATM 4, and the operating institution of the ATM 4 fills cash in the ATM 4 operated by the corresponding institution based on the operating funds transferred to the savings account. In the above-described process, each funds transfer process may be automatically performed by the funds settlement module 34 of the deposit and withdrawal service system 3, or may be manually performed by the manager of each institution.

For example, the funds settlement module 34 may issue an unique account number (for example, a virtual account, etc.) corresponding to each institution 1, notify it to the institution 1, and when there is an amount deposited in the corresponding account, maintain the balance of the account at 0 and transfer the total deposit or the operating funds corresponding to the deposit minus the fee to the savings account of the operating institution of the ATM 4. The above-described transfer process may be performed by communication of the transfer execution unit 342 of the funds settlement module 34 with a financial institution server, for example, a bank, using authentication information (for example, an authenticity certificate, an account name, an account number, a password, etc.) corresponding to the operator of the deposit and withdrawal service system 3. Additionally, in an embodiment, the transfer process by the transfer execution unit 342 may be performed by a scraping method of automatically accessing the web page provided by the financial institution server using the above-described authentication information.

Additionally, the funds settlement module 34 of the deposit and withdrawal service system 3 having received the processing result from the institution 1 may further perform a subtraction process of the deposit limit of the institution 1 (S18), if necessary. The funds settlement module 34 may manage the operating funds that have been deposited from the institution 1 into the savings account of the ATM 4 via the operating account of the deposit and withdrawal service system 3 as the limit of the institution 1, and when it is necessary to perform a transaction of cash payment through the ATM 4 such as withdrawal transaction of the virtual asset, the funds settlement module 34 may subtract the withdrawal amount from the limit of the institution 1.

When it is a transaction in the balance range of the virtual asset of the member 100, but withdrawal of an amount more than the cash deposit limit of the institution 1 is requested, even though the institution 1 approves the transaction request, the deposit and withdrawal service system 3 may reject the transaction request of the ATM 4 on the ground that the deposit is less than the limit, thereby disallowing the institution 1 to approve the withdrawal transaction above the prepaid cash balance.

Figure 4:
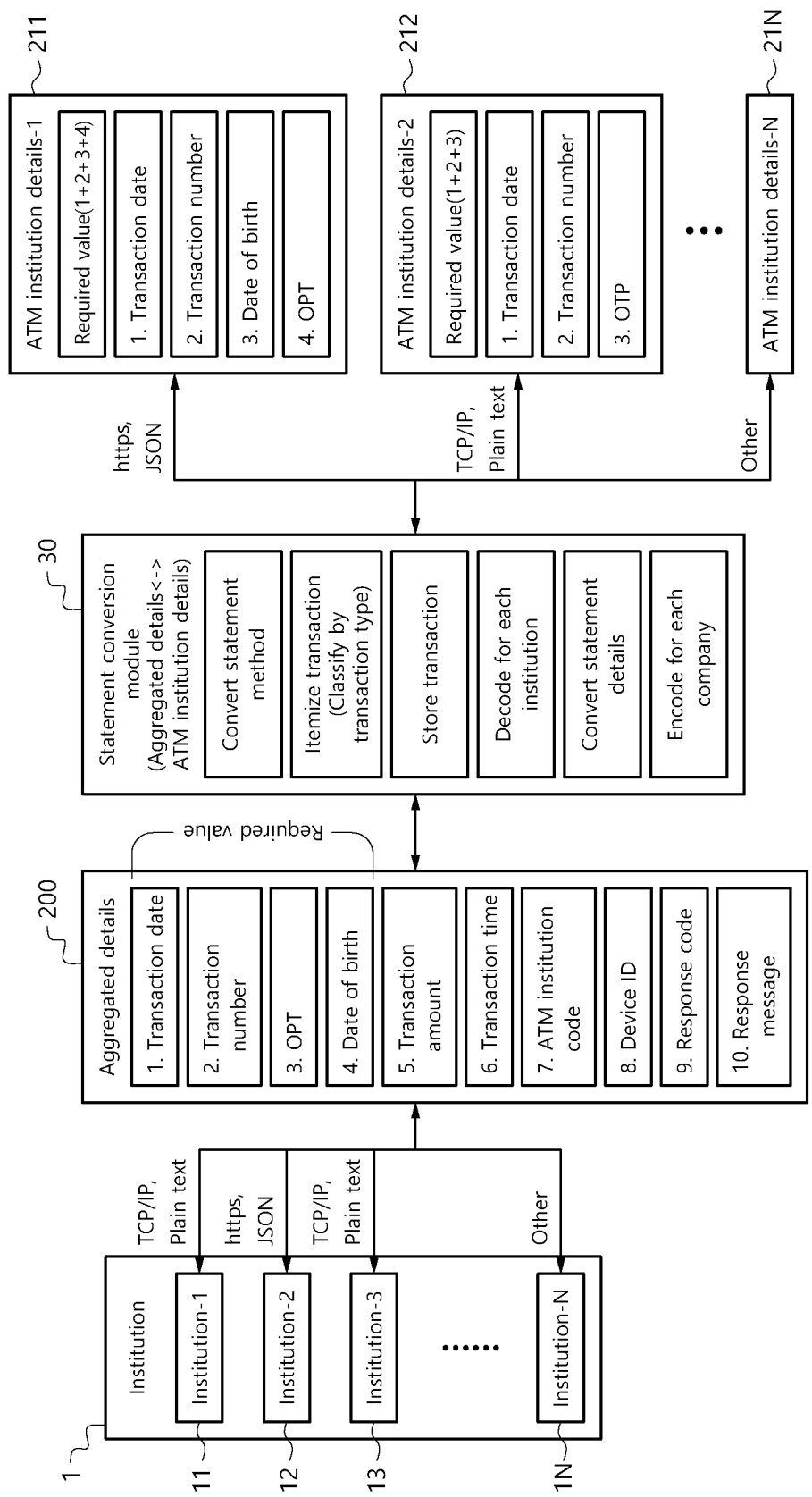
FIG. 4 is a conceptual diagram showing conversion between aggregated details data and ATM statement details data by a deposit and withdrawal service system using ATM according to an embodiment.
Figure 5:
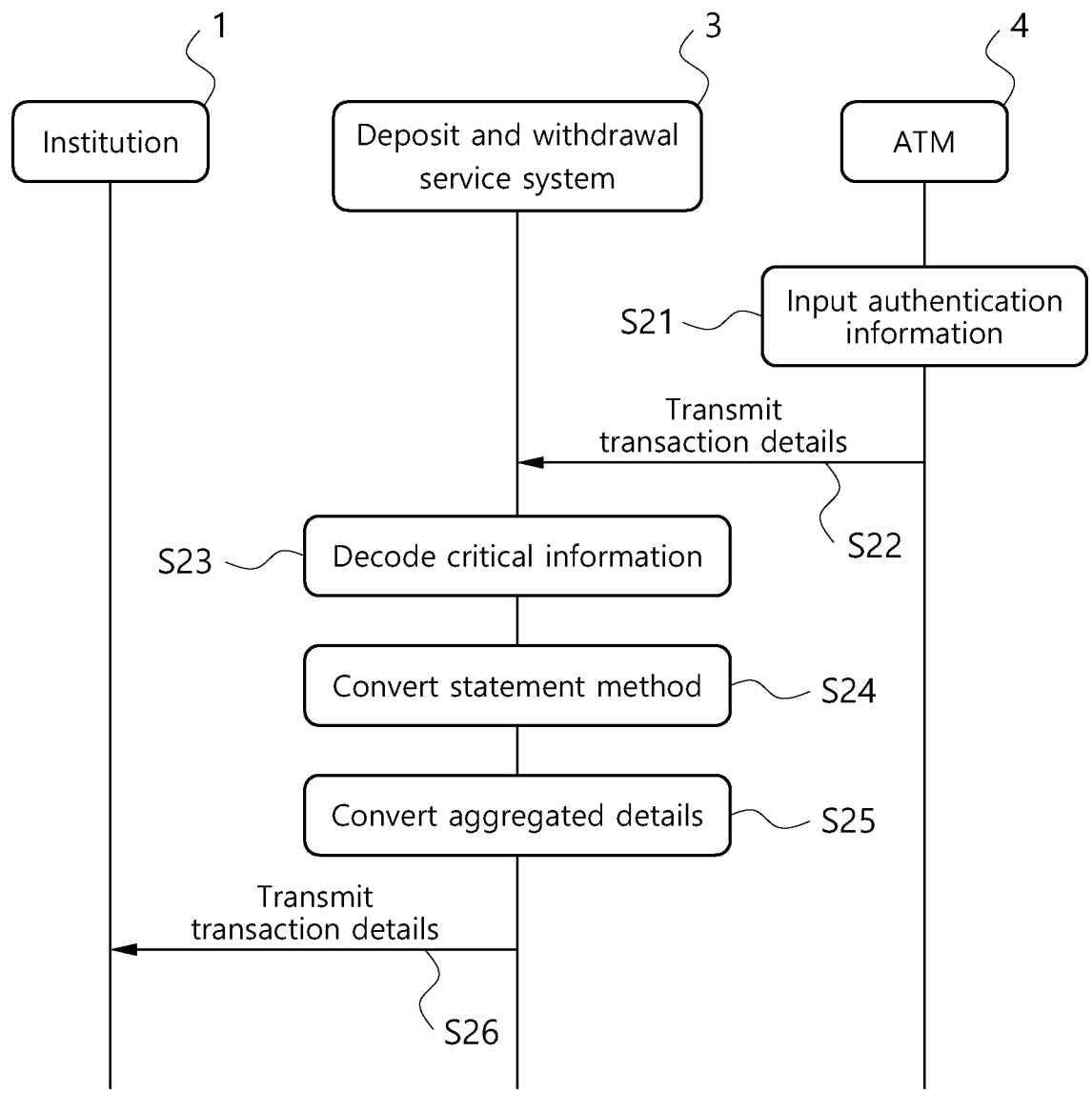
FIG. 5 is a flowchart showing each step of a process of processing a transaction request from ATM in a deposit and withdrawal service method using ATM according to an embodiment.

FIG. 4 is a conceptual diagram showing conversion between the aggregated details data and the ATM statement details data by the deposit and withdrawal service system using ATM according to an embodiment. Additionally, FIG. 5 is a flowchart showing each step of the process of processing the transaction request from the ATM in the deposit and withdrawal service method according to an embodiment. For convenience, the transaction request processing process of the deposit and withdrawal service method using ATM according to this embodiment will be described with reference to FIGS. 4 and 5.

When the member of the institution 1 requests a transaction by inputting authentication information to the ATM 4 (S21), the deposit and withdrawal service system 3 may receive the transaction request including transaction details and the authentication information from the ATM 4 (S22). Additionally, the transaction request may further include device identification information of the ATM 4 requesting the transaction, identification information of the operating institution of the ATM 4 and/or personal identification information the member related to the institution 1. Further, the transaction request may further include information for identifying the corresponding transaction, for example, the transaction request time and transaction unique number.

In this instance, the received transaction request may be different in the communication protocol such as https and TCP/IP, and the format of the transmitted/received data such as JSON and plain text depending on the operating institution of the ATM 4 requesting the transaction, and in the specification, the format related to data transmission/reception including the communication protocol and the data format is referred to as a statement method. For example, one ATM 4 may transmit a transaction request statement in the JSON data format using the https communication protocol, while another ATM 4 may transmit a transaction request statement in the plain text data format using the TCP/IP communication protocol.

In this instance, the statement conversion module 30 of the deposit and withdrawal service system 3 according to embodiments may convert the transaction request received in the statement method of the ATM 4 from the corresponding ATM 4 into an intermediate data format that is independent from the ATM (S24).

In an embodiment, when all or part of the transaction request statement is encoded, the deposit and withdrawal service system 3 may further perform a process of decoding the encoded data (S23). For example, among the information included in the transaction request, critical information including personal identification information (for example, member registration information in the institution 1, the member card number, the member's date of birth, etc.) of the member and authentication information that the member receives from the institution 1 and inputs to the ATM 4 may be transmitted in an encoded format, and the deposit and withdrawal service system 3 may receive the corresponding information and decode it (S23). In the encoding, the SEED encryption protocol of Electronic Code Book (ECB) mode or Cipher Block Chaining (CBC) mode may be used, but the encoding method is not limited thereto.

Subsequently, the statement conversion module 30 may convert the transaction request of the intermediate data format into aggregated details data 200 (S25). The aggregated details data 200 has an independent layout of information that is irrelevant to the type of the ATM 4 having requested the corresponding transaction or the institution 1 that will perform the corresponding transaction. In an embodiment, the aggregated details data 200 includes information including the transaction date, the transaction number, the authentication information (OTP), the member's date of birth and the transaction amount as the required value. Additionally, in an embodiment, the aggregated details data 200 may further include the transaction time, the institution code corresponding to the operating institution of the ATM 4, and the device identification information (ID) corresponding to the individual ATM 4, and the response provided by the institution 1 may further include a response code and/or a response message.

The transaction request statement transmitted from each ATM 4 has different information layout depending on the operating institution of the ATM 4. The statement details 211 of one ATM operating institution may have the transaction date, the transaction number, the authentication information (OTP) and the member's date of birth as the required value, while statement details 212 of another ATM operating institution may have the transaction date, the transaction number and the authentication information (OTP) as the required value. The statement conversion module 30 generates the aggregated details data 200 by determining the type and/or sequence of information to be included in aggregated details based on the information included in the transaction request statement.

The following Table 1 shows statement details used to request cash withdrawal from the ATM 4 based on the virtual asset and transmit a withdrawal approval of the institution 1 based on the virtual asset to the ATM 4, and in particular, it corresponds to statement details data for socket based communication.

TABLE 1

| Classification | Number | Item name | Description |
| --- | --- | --- | --- |
| Header | 1 | Statement length | Total length of statement |
| | 2 | Statement code | Preset statement classification |
| | 3 | Task code | Preset transaction classification |
| | 4 | Institution code | Institution identification information |
| | 5 | Processing institution | Institution identification information |
| | 6 | Transmission date | |
| | 7 | Transmission time | |
| | 8 | Transaction unique number | Identifier uniquely given to transaction |
| | 9 | Response code | Preset processing result classification |
| | 10 | Device number | ATM identification information in which transaction occurred |
| Data | 11 | Blank | |
| | 12 | Fee | |
| | 13 | Transaction classification | |
| | 14 | Transaction amount | |
| | 15 | Authentication number | |
| | 16 | Date of birth | |
| | 17 | Blank | |

In another example, the following Tables 2 and 3 show statement details used to request cash withdrawal from the ATM 4 based on the virtual asset, and statement details used to transmit a withdrawal approval of the institution 1 based on the virtual asset to the ATM 4 in response to the request, respectively, and in particular, it corresponds to statement details data for Uniform Resource Locator (URL) connection based communication.

TABLE 2

| Parameter | Description |
| --- | --- |
| CODE | Institution identification information |
| PASS | Institution link encryption |
| MemberPin | Member personal identification number |
| PaymentKey | Authentication number |
| SeqNo | Transaction unique number |
| ATMCode | ATM terminal number |
| AtmDrawRequestTime | ATM withdrawal request time |
| Flag | ATM institution identification information |

TABLE 3

| Parameter | Description |
| --- | --- |
| ResultCode | Response code |
| ResultMsg | Response message |
| Money | Withdrawal amount |
| Fee | Fee |
| MemberPin | Member personal identification number |
| PaymentKey | Withdrawal authentication number |
| SeqNo | Transaction unique number |
| ATMCode | ATM terminal number |
| AtmDrawRequestTime | ATM withdrawal request time |
| Flag | ATM institution identification information |

In the statement details data shown in Tables 1 to 3, the member's personal information such as the member personal identification number and the date of birth, and the authentication information such as OTP that the member inputted to the ATM 4 may be encoded. For example, the result value of processing the encoded data of the above-described information by the SEED encryption protocol by an encoding algorithm, for example, Base64 may be described in the statement details data.

Additionally, although the above Tables 1 to 3 describe the type of the withdrawal request through the ATM 4 and the statement details data transmitted in response to the withdrawal request for illustrative purposes, the type and sequence of information included in the statement details data may be different depending on the type of transaction to be processed through the ATM 4 and the policy of the operating institution of the ATM 4. For example, in the case of cancellation transaction, in addition to the information included in the statement details data of Tables 1 to 3, the original transaction date, the original transaction unique number and/or the affiliated company transaction number for the original transaction may be further included.

Subsequently, the statement conversion module 30 may transmit the aggregated details data to the institution 1 that will perform the corresponding transaction (S26). In this instance, in transmitting the aggregated details data to the institution 1, the deposit and withdrawal service system 3 may convert the aggregated details data into a data format according to the statement method used by each institution 1, and transmit the aggregated details data using the communication protocol used by each institution 1. For example, one institution 11 may transmit the aggregated details data in the plain text data format using the TCP/IP communication protocol, while another institution 12 may transmit the aggregated details data in the JSON data format using the https communication protocol.

Figure 6:
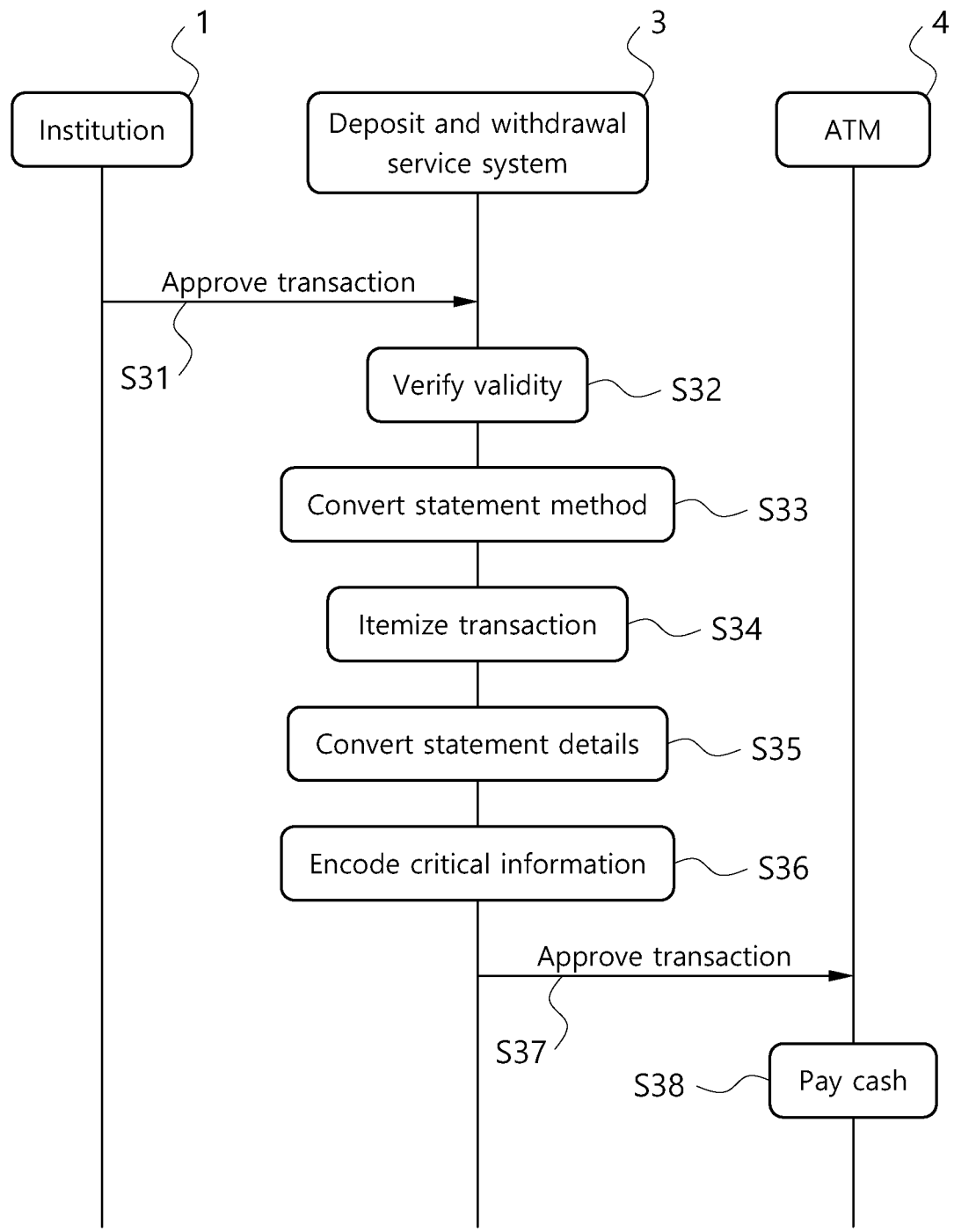
FIG. 6 is a flowchart showing each step of a process of returning a processing result of a transaction request back to ATM in a deposit and withdrawal service method using ATM according to an embodiment.

FIG. 6 is a flowchart showing each step of a process of returning the processing result of the transaction request back to the ATM in the deposit and withdrawal service method according to an embodiment, and the process of returning the processing result of the institution is performed in the reverse order of the transmission of the transaction request described above with reference to FIG. 5. For convenience of description, the process of returning the transaction result of the deposit and withdrawal service method using ATM according to this embodiment will be described with reference to FIGS. 4 and 6.

In relation to the transaction requested through the aggregated details data of the deposit and withdrawal service system 3, the institution 1 may verify the virtual asset balance of the member having requested the corresponding transaction and the one-time authentication information included in the transaction request, and when there is no problem in performing the transaction, the institution 1 may notify a transaction approval to the deposit and withdrawal service system 3 (S31). This is performed such that the institution 1 transmits a processing result statement including a response code and/or a response message to the deposit and withdrawal service system 3 according to the statement method used by the corresponding institution 1. In case that it is impossible to perform the requested transaction since the member has a negative virtual asset balance, the processing result including a response code corresponding to an error code will be transmitted to the deposit and withdrawal service system 3.

In an embodiment, the deposit and withdrawal service system 3 may further perform a process of verifying the validity of the response of the institution 1 to identify if the transaction approval of the institution 1 is normally made (S32). In this instance, the validity verification process (S32) may include verification for the presence or absence of task affiliation between the institution 1 and the operator of the deposit and withdrawal service system 3, verification for the service condition of the institution 1, verification for permission of the API provided by the deposit and withdrawal service system 3 to the institution 1, verification for registration of the error condition of the institution 1 related to the corresponding API, and/or verification for the transaction unique number (for example, check digit) of the request through the corresponding API, but is not limited thereto.

Although the embodiment described herein describes that the validity verification process (S32) is performed after receiving the processing result of the institution 1, in another embodiment, the deposit and withdrawal service system 3 may verify the transaction request transmitted from the ATM 4, and when the verification fails, reject the processing of the requested transaction. Further, in still another embodiment, the deposit and withdrawal service system 3 may relay the transaction statement transmitted between the ATM 4 and the institution 1 without a separate verification process.

Subsequently, the statement conversion module 30 of the deposit and withdrawal service system 3 may convert the processing result received in the statement method of the corresponding institution 1 from the institution 1 into independent aggregated details data regardless of the type of the institution 1 or the operating institution of the ATM 4 (S33). In this instance, when all or part of the processing result received from the institution 1 is encoded, the deposit and withdrawal service system 3 may decode the encoded information.

Subsequently, the statement conversion module 30 may itemize the aggregated details data corresponding to the processing result according to the ATM 4 having requested the corresponding transaction and the type of the requested transaction (S34), and convert the aggregated details data into statement details data conforming to the statement method of the corresponding ATM 4 (S35). To this end, the statement conversion module 30 may include information about the layout of the statement details data of each ATM 4.

For example, assume that statement details 211 of one ATM operating institution require the transaction date, the transaction number, the member's date of birth and the authentication information (OTP) as the required value, and statement details 211 of another ATM operating institution require transaction date, transaction number and authentication information (OTP) as the required value. In this instance, the statement conversion module 30 may extract information necessary for the statement of each ATM operating institution from the information included in the aggregated details data 200 and arrange it in an order of the corresponding statement to generate statement details data to be transmitted to each ATM 4.

In an embodiment, the deposit and withdrawal service system 3 may encode all or part of the information included in the statement details data, prior to transmitting the statement details data corresponding to the processing result of the institution 1 to the ATM 4 having requested the corresponding transaction (S36). For example, among the information included in the statement details data, the member's personal identification information (the member registration information, the member's card number, the member's date of birth, etc.) and the authentication information may be encoded by the SEED encryption protocol of ECB mode or CBC mode, but the encoding method is not limited thereto.

Subsequently, the deposit and withdrawal service system 3 may transmit the statement details data converted to have the layout of information corresponding to the ATM 4 having requested the transaction to the corresponding ATM 4 (S37). In this instance, in transmitting the generated statement details data to the ATM 4, the communication module 31 (FIG. 1) of the deposit and withdrawal service system may convert into a statement method used by the corresponding ATM 4 and transmit it. For example, the statement details data may be transmitted to the ATM 4 as data of JSON format through the https communication protocol.

Meanwhile, the statement method of the statement details data 211, 212, 21N for each ATM operating institution and for each institution 1 as shown in FIG. 4 are provided for illustrative purposes, and may be different depending on the corresponding institution, and is not limited by the example shown in the drawings of the specification.

The ATM 4 having received the transaction approval which is the processing result of the institution 1 from the deposit and withdrawal service system 3 may deposit and withdraw the virtual asset requested by the member through the ATM 4. For example, when the member requests to withdraw the virtual asset (points, virtual money, etc.) in cash through the ATM 4, the ATM 4 may pay cash to the member in response to the transaction approval (S38).

The operation by the deposit and withdrawal service method using ATM according to embodiments as described hereinabove may be, at least in part, implemented as a computer program and recorded in a computer-readable recording medium. The computer-readable recording medium that records a program for implementing the operation by the method according to embodiments includes any type of recording device in which computer-readable data is stored. Examples of the computer-readable recording medium include ROM, RAM, CD-ROM, magnetic tape, floppy disk, optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

Additionally, each block or each step shown in the flowcharts of the specification may indicate some of modules, segments or codes including at least one executable instruction for executing particular logical function(s). Additionally, in some alternative embodiments, functions mentioned in the blocks or steps may be executed in an out-of-order manner. For example, two consequent blocks or steps shown may be substantially performed at the same time, or in some instances, the blocks or steps may be performed in the reverse order according to the corresponding function.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall in the technical protection scope of the present disclosure. Therefore, the true technical protection scope of the present disclosure should be defined by the technical spirit of the appended claims.

What is claimed is:

1. A deposit and withdrawal service system using Automated Teller Machine (ATM), comprising:
a communication module configured to receive a transaction request associated with a customer's asset managed by at least one first institution from an ATM among a plurality of ATMs respectively operated by a plurality of second institutions that are different from each other, and transmit a processing result received from the first institution in response to the transaction request to the ATM among the plurality of ATMs having requested the transaction; and
a statement conversion module configured to convert the transaction request received from the ATM into aggregated details data having a first information layout that is independent from the ATM, and convert the processing result received from the first institution into statement details data corresponding to the ATM having requested the transaction,
wherein the communication module is further configured to transmit the aggregated details data to the first institution, receive the processing result from the first institution, and transmit the processing result to the ATM as the statement details data,
wherein the transaction request comprises device identification information of the ATM and identification information of a second institution of the plurality of second institutions that operates the ATM,
wherein each of the transaction request and the statement details data has a second information layout determined based on the second institution operating the ATM, wherein the second information layout defines a type and a sequence of at least one information item corresponding to a required value among information items related to a transaction date, a transaction number, an authentication information or a personal information of a user, the type of the required value in the second information layout being different according to the second institution operating the ATM,
wherein the statement conversion module is further configured to:
generate the aggregated details data, to be transmitted to the first institution, by extracting and arranging at least one predetermined information item, based on the first information layout, among the transaction date, the transaction number, the authentication information, the personal information of the user, a transaction amount, a transaction time, an identification information of the second institution and an identification information of the ATM from information included in the transaction request, a type and a sequence of information items of the first information layout being irrelevant from the ATM and the second institution;

store the second information layout corresponding to the plurality of ATMs; and extract, based on the second information layout corresponding to the ATM having requested the transaction, at least one information item corresponding to the required value and arrange the at least one information item extracted based on the second layout to generate the statement details data, wherein the deposit and withdrawal service system further comprises:

a funds settlement module configured to send operating funds corresponding to a deposit of the first institution to an account of the second institution operating the ATM for cash payment by the ATM.

2. The deposit and withdrawal service system using ATM according to claim 1, wherein the statement conversion module comprises:

a statement method conversion unit configured to convert the transaction request or the processing result into intermediate data of a statement method;

a transaction itemization unit configured to determine at least one of a transaction type, an institution or an ATM corresponding to the transaction request or the processing result; and a statement details conversion unit configured to convert the intermediate data into the aggregated details data or the statement details data based on at least one of the transaction type, the institution or the ATM determined by the transaction itemization unit.

3. The deposit and withdrawal service system using ATM according to claim 1, wherein the transaction request includes one-time authentication information provided to a user using the first institution by the first institution and identification information corresponding to the first institution, and the aggregated details data includes the one-time authentication information for authentication by the first institution, and the communication module is further configured to transmit the aggregated details data to the first institution corresponding to the transaction request using the identification information.

4. The deposit and withdrawal service system using ATM according to claim 1, wherein the funds settlement module is further configured to, before transmitting the processing result to the ATM, subtract a withdrawal amount corresponding to the processing result from the deposit of the first institution, and when the deposit of the first institution is less than the withdrawal amount, reject the transaction request of the ATM.

5. The deposit and withdrawal service system using ATM according to claim 1, further comprising:

a location providing module configured to provide location information of at least one ATM capable of communicating with the deposit and withdrawal service system in response to the request received from the first institution or a user device of a user using the first institution.

6. A deposit and withdrawal service method using Automated Teller Machine (ATM), comprising:

receiving, by a deposit and withdrawal service system, a transaction request associated with a customer's asset managed by at least one first institution from an ATM among a plurality of ATMs respectively operated by a plurality of second institutions that are different from each other;

converting, by the deposit and withdrawal service system, the transaction request received from the ATM among the plurality of ATMs into aggregated details data having a first information layout that is independent from the ATM;

transmitting, by the deposit and withdrawal service system, the aggregated details data to the first institution;

receiving, by the deposit and withdrawal service system, a processing result corresponding to the aggregated details data from the first institution;

converting, by the deposit and withdrawal service system, the processing result into statement details data corresponding to the ATM having requested the transaction; and transmitting, by the deposit and withdrawal service system, the statement details data to the ATM, wherein the transaction request comprises device identification information of the ATM and identification information of a second institution of the plurality of second institutions operating the ATM, wherein each of the transaction request and the statement details data has a second information layout determined based on the second institution operating the ATM, wherein the second information layout defines a type and a sequence of at least one information item corresponding to a required value among information items related to a transaction date, a transaction number, an authentication information or a personal information of a user, the type of the required value in the second information layout being different according to the second institution operating the ATM, wherein converting the transaction request into the aggregated details data comprises, by the deposit and withdrawal service system, generating the aggregated details data to be transmitted to the first institution by extracting and arranging at least one predetermined information item, based on the first information layout, among the transaction date, the transaction number, the authentication information, the personal information of the user, a transaction amount, a transaction time, an identification information of the second institution and an identification information of the ATM from information included in the transaction request, a type and a sequence of information items of the first information layout being irrelevant from the ATM and the second institution, and wherein the deposit and withdrawal service method further comprises:

before converting the processing result into statement details data, storing, by the deposit and withdrawal service system, the second information layout corresponding to the plurality of ATMs in the deposit and withdrawal service system, and wherein converting the processing result into statement details data comprises:

extracting, by the deposit and withdrawal service system, at least one information item corresponding to the required value based on the second information layout corresponding to the ATM having requested the transaction; and arranging, by the deposit and withdrawal service system, the at least one information item extracted based on the second layout to generate the statement details data, and wherein the deposit and withdrawal service method further comprises:

sending, by the deposit and withdrawal service system, operating funds corresponding to a deposit of the first institution to an account of the second institution operating the ATM for cash payment by the ATM.

7. The deposit and withdrawal service method using ATM according to claim 6, wherein converting into the statement details data comprises:
   converting, by the deposit and withdrawal service system, the processing result into intermediate data of a statement method;
   determining, by the deposit and withdrawal service system, at least one of a transaction type, an institution or an ATM corresponding to the processing result; and
   converting, by the deposit and withdrawal service system, the intermediate data into the statement details data based on at least one of the determined transaction type, institution or ATM.

8. The deposit and withdrawal service method using ATM according to claim 6, wherein the transaction request includes one-time authentication information provided to a user using the first institution by the first institution and identification information corresponding to the first institution, and the aggregated details data includes the one-time authentication information for authentication by the first institution, and
   transmitting the aggregated details data to the first institution comprises identifying, by the deposit and withdrawal service system, the first institution corresponding to the transaction request using the identification information.

9. The deposit and withdrawal service method using ATM according to claim 6, further comprising:
   before transmitting the statement details data to the ATM, subtracting, by the deposit and withdrawal service system, a withdrawal amount corresponding to the processing result from the deposit of the first institution; and
   rejecting, by the deposit and withdrawal service system, the transaction request of the ATM when the deposit of the first institution is less than the withdrawal amount.

10. The deposit and withdrawal service method using ATM according to claim 6, further comprising:
    providing, by the deposit and withdrawal service system, location information of at least one ATM capable of communicating with the deposit and withdrawal service system in response to the request received from the first institution or a user device of a user using the first institution.

11. A computer program stored in a computer-readable recording medium to perform the deposit and withdrawal service method using ATM according to claim 6 in combination with hardware.

\* \* \* \* \*